US 9,298,740 B2

(12) United States Patent
Brouwer, II et al.

(10) Patent No.: US 9,298,740 B2
(45) Date of Patent: Mar. 29, 2016

(54) SYSTEM AND METHOD FOR ENHANCING THE NORMALIZATION OF PARCEL DATA

(71) Applicant: CoreLogic Solutions, LLC, Irvine, CA (US)

(72) Inventors: Derek John Brouwer, II, Irvine, CA (US); Peter A. Nagy, Irvine, CA (US); Sunkyu Hwang, Irvine, CA (US)

(73) Assignee: CoreLogic Solutions, LLC, Irvine, CA (US)

( * ) Notice: Subject to any disclaimer, the term of this patent is extended or adjusted under 35 U.S.C. 154(b) by 187 days.

(21) Appl. No.: 14/035,978

(22) Filed: Sep. 25, 2013

(65) Prior Publication Data
US 2015/0088886 A1    Mar. 26, 2015

(51) Int. Cl.
G06F 17/30    (2006.01)

(52) U.S. Cl.
CPC .... G06F 17/30241 (2013.01); G06F 17/30598 (2013.01)

(58) Field of Classification Search
None
See application file for complete search history.

(56) References Cited

U.S. PATENT DOCUMENTS

| 7,890,509 B1* | 2/2011 | Pearcy et al. ................ 707/736 |
| 2006/0238383 A1* | 10/2006 | Kimchi et al. ............. 340/995.1 |
| 2010/0198504 A1* | 8/2010 | Samsalovic et al. .......... 701/207 |
| 2011/0173227 A1* | 7/2011 | Klein ........................ 707/769 |

* cited by examiner

Primary Examiner — Wilson Lee
(74) Attorney, Agent, or Firm — Muncy, Geissler, Olds & Lowe, P.C.

(57) ABSTRACT

System and methods are disclosed that attempt to verify data related to a parcel against mapping and addressing data. If the data cannot be verified, then an enhanced normalization process may be performed. The enhanced normalization process may attempt to group the parcel with some other parcels based on parcel characteristics. If the grouping is successful, then normalization may be performed on the grouping. Normalization may involve checking whether the grouping satisfies a set of grouping criteria.

19 Claims, 3 Drawing Sheets

SYSTEM AND METHOD FOR ENHANCING THE NORMALIZATION OF PARCEL DATA

BACKGROUND

1. Field

The present disclosure relates to data and, more specifically, to parcel data processing and acquisition.

2. Description of the Related Art

Several market sectors may have an interest in data for specific parcels. Entities such as banks, insurance companies, real estate agents, government agencies, and utility providers may need parcel specific data. For example, real estate agents may need a parcel valuation to use in considering an offer for a specific parcel. As another example, a bank may need to know whether a parcel they are providing a mortgage for is in a high-risk flood zone. Because of the wide range of sources of information for parcels, it may be difficult for companies to locate information for a particular property without consulting several sources of data.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Various aspects of the disclosure will now be described with regard to certain examples and embodiments, which are intended to illustrate but not to limit the disclosure.

Computer-based systems and methods are disclosed for performing normalization of parcel data. In some embodiments, the systems and methods can improve management of parcel data by grouping parcels in remote areas. In some embodiments, the systems and methods can enhance parcel data by maintaining parcel data that may have been discarded in traditional systems.

Overview

In some embodiments, an attempt to verify data related to a parcel against mapping and addressing data can be made. If the data cannot be verified, then an enhanced normalization process may be performed. The enhanced normalization process may attempt to group the parcel with some other parcels based on parcel characteristics. The parcel characteristics can include, in some embodiments, a variety of attributes associated with parcels, such as a street name, a zip code, a county, etc. If the grouping is successful, then normalization may be performed on the grouping. Normalization may involve checking whether the grouping satisfies a set of grouping criteria. The grouping criteria may involve a variety of factors and attributes related to the parcels. In some embodiments, the parcels may also be checked to confirm they are located in remote, such as wilderness areas.

Example Parcel System

Figure 1:
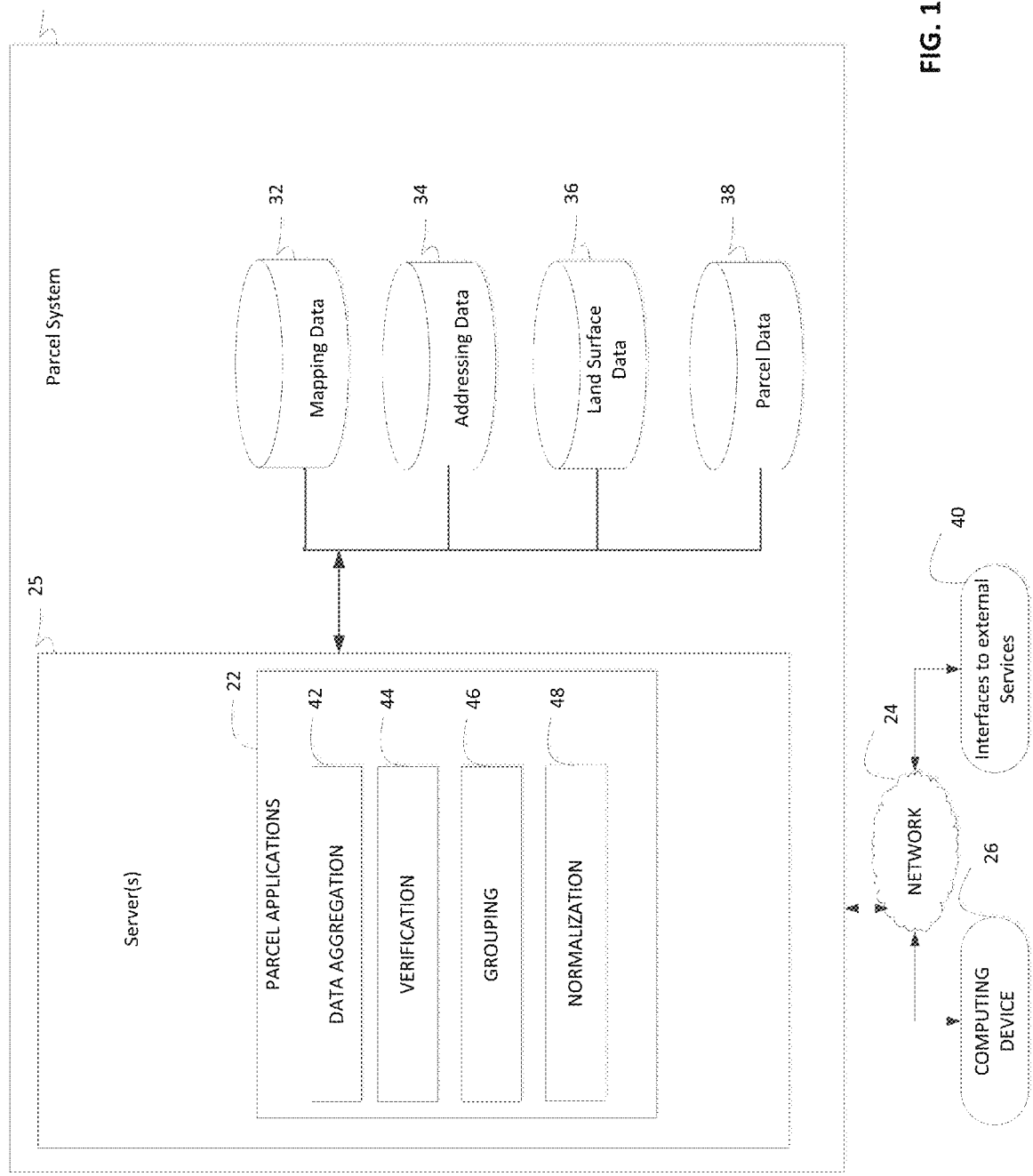
FIG. 1 is a block diagram that schematically illustrates an example of a system to perform parcel normalization.

FIG. 1 illustrates a parcel system 20 according to one embodiment. The system may be provided by a business entity or "parcel data provider" that provides various services to its customers for acquiring and managing parcel data associated with properties. As illustrated, the system includes a set of parcel applications 22 that are accessible over a network 24 (such as the Internet) via a computing device 26 (desktop computers, mobile phones, servers, etc.). Typical customers of the system 20 include banks, insurance companies, real estate agents, and government agencies.

As illustrated, parcel applications 22 use a set of data repositories 32-38 to perform various types of parcel data management tasks, including tasks associated with parcel acquisition. In the illustrated embodiment, these data repositories 32-38 include a database of mapping data 32, a database of addressing data 34, a database of land surface data 36, and a database of parcel data 38. Although depicted as separate databases, some of these data collections may be merged into a single database or distributed across multiple distinct databases. Further, additional databases containing other types of information may be maintained and used by the parcel applications 22. As shown in FIG. 1, each parcel application 22 runs on one or more physical servers 25 or other computing devices.

The database of mapping data 32 contains mapping data obtained from one or more of the entities, such as NAVTEQ, Google, TomTom, HERE, Apple, etc., that include Geographic Information Systems ("GIS") data associated with real estate properties. The database of addressing data 34 contains addressing data obtained from one or more of the entities, such as government agencies, that include mailing address data associated with real estate properties. The database of land surface data 36 contains land surface data obtained from one or more of the entities, such as United States Geological Survey ("USGS"), National Land Cover Database ("NLCD"), U.S. Department of Agriculture ("USDA"), National Resources Conservation Service ("NRCS"), that include land surface data associated with real estate properties. Land surface data can include land surface characteristics (e.g., catchment slope, hydrological properties, infiltration of soils, imperviousness of land use, interceptions of forest coverage, etc.) of the land that a property resides on. The database of parcel data 36 contains parcel data obtained from one or more of the entities, such as counties, townships, states, etc., that include parcel data associated with properties. Commonly owned U.S. Pat. No. 7,890,509, contents of which are incorporated herein by reference in its entirety, describe the process to acquire and generate a parcel database.

As further shown in FIG. 1, the system 20 may also include one or interfaces 40 to other (externally hosted) services and databases. For example, the system may include APIs or other interfaces for retrieving data from LexisNexis, Merlin, MERS, particular real estate companies, government agencies, and other types of entities.

As further shown in FIG. 1, the parcel applications 22 include a "data aggregation" application or application component 42 (hereinafter "application 42"). As explained below, this application or component 42 use some or all of the data sources described above to acquire parcel data from multiple entities.

The parcel applications 22 also include a "verification" application or application component 44 (hereinafter "application 44"). As explained below, this application or component 44 is configured to validate parcel data for properties. The parcel applications 22 also include a "grouping" application or application component 46 (hereinafter "application 46"). As explained below, this application or component 46 groups parcel data for properties to enhance parcel geocoding.

The parcel applications 22 further include a "normalization "application 48"). As explained below application or component 48 can communicate with applications 42, 44, or 46, to normalize the grouped parcel data for properties.

Data Aggregation

Application 42 may be configured to acquire parcel data from multiple entities, such as communities (e.g., from a GIS department, recorder's office, or tax assessor's office, and private corporations). Application 42 can be configured to aggregate parcel data and store the aggregated data in parcel database 38. As discussed in commonly owned U.S. Pat. No. 7,890,509, parcel data may be acquired from multiple entities and normalized. In some embodiments, scripts may be used to perform data standardization and/or normalization of parcel data from different sources into a common format database or collection of databases. For example, data may be collected from sources (e.g., external) and scripts may be used to convert the data, clean-up/repair data, and track data during the acquisition process. Scripts may perform these functions in an automated manner or may execute with manual assistance from a system user (e.g., through a graphical user interface).

Data Verification

Application 44 may be configured to verify the acquired parcel data. In some embodiments, the verification may occur before the aggregated parcel data is stored in the parcel database 38 by application 42. As discussed above, a variety of entities rely on parcel data for different applications, such as flood risk determinations. As a consequence, accuracy of the parcel data can become important. To enhance the accuracy of the parcel data, the acquired parcel data may be compared to the mapping data 32 and addressing data 34.

In one embodiment, only the parcel data that has been verified against the mapping data 32 and/or addressing data 34 is maintained in the parcel database 38. That is, if it is confirmed that the acquired parcel data is in agreement with related data from the mapping database 32 and/or addressing database 34, then the parcel data is maintained. Adjustments may also be made to the parcel data to ensure agreement with the mapping and/or addressing data. For example, for a particular parcel, attributes, such as the zip code, city, county, state, etc., may be compared to data in the mapping database 32 and addressing database 34. The comparison can verify whether the mapping data shows that the parcel information exists in the mapping database 32 and whether the attributes associated with the parcel are accurate. Adjustments may also be made to the attributes (e.g., pre-direction, pre-type, street name, post-direction, post-type, city, state, zip code, etc.) to ensure they are in agreement with the mapping data.

Furthermore, additional information from the mapping database 32 that is linked to the parcel data may also be collected and stored in the parcel database 38. Similarly, the comparison can also verify whether the addressing data shows the parcel information exists in the addressing database 34 and whether the attributes associated with the parcel are accurate. Similarly adjustments and/or additions, as discussed above, may also be made to ensure agreement with the addressing data. Different algorithms may be performed for the verification. For example, weights and/or priorities may be applied to the mapping data 32 and addressing data 34. For example, in some regions the mapping data may be known to be more accurate. In those regions a higher weight/priority may be applied in the verification process. Higher priority/weight can be used to determine the accuracy of the parcel attributes and what, if any, adjustments and/or additions should be made. In some embodiments, a weighted matching algorithm may be applied to the parcel attributes to determine when the parcel data has been verified. For example, the parcel attributes may be compared with the mapping and addressing data, and a match score based on the weights can be determined. If the match score exceeds a certain threshold, then the parcel data may be considered verified. Such a verification process is provided by CoreLogic, Inc.

As discussed above, in some embodiments, if the parcel data cannot be verified, the parcel data is not maintained. The parcel data can be discarded in some embodiments. This process may lead to the failure of maintaining valid parcel data. For example, there may be areas where mapping data, such as from NAVTEQ, are poorly identified or deficient and where addressing data may be lacking because, for example, the government does not deliver mail to those areas. However, these areas may still be valid parcels and relevant to maintaining an accurate parcel database 38. These areas may include remote areas, such as wilderness areas (e.g., forests, mountains, islands, parks, trails, bodies of water, etc.) To account for parcel data that cannot be verified, embodiments of the present invention analyze the parcel data that cannot be verified to determine if accuracy of the parcel data can be confirmed in other ways in order to maintain the parcel data.

Grouping

Application 46 may be configured to group acquired parcel data that cannot be verified. In some embodiments, the grouping may include grouping parcel data based on their respective characteristics, such as attributes to determine if parcel data associated with a first parcel can be verified by parcel data associated with a second parcel. For example, parcel data that has not been verified can be grouped based on the attribute street name. The groupings would include all the parcels categorized by street name. If the groupings include multiple parcels, then the groupings can confirm that since multiple parcels are associated with the same street name, it is likely that those parcels are accurate and can be maintained and stored in parcel database 38. Similar analysis and groupings can be performed based on any of the other parcel attributes or combination of attributes.

In some embodiments, the grouping may focus on parcels that are known to be in remote areas, such as wilderness areas. As discussed above, wilderness areas are likely difficult to verify with the mapping data 32 and addressing data 34. As such, the grouping process, in some embodiments, may only focus on parcels in these remote areas. Land surface data 36 may be accessed to determine the parcels that are characterized as remote areas, such as wilderness areas. For instance, forest areas may be determined by accessing USGS data. Then the parcels associated with those forest areas that could not be verified are analyzed in accordance with the grouping process discussed above. The grouping process then can result in the grouping of parcels in forest areas with similar attributes. As discussed above, the groupings can be used to confirm that those parcels should be maintained and stored in parcel database 38. The groupings themselves may also be stored in a data repository, such as parcel database 38. The groupings can be provided in a report, graphical output, map output, or any other type of format. In some embodiments, the groupings may be combined to form larger groups. The groupings may be combined using a similar process as discussed above. The groupings may be combined based on a variety of factors and/or attributes to perform the grouping.

Normalization

Application 48 may be configured to normalize the grouped parcel data. In some embodiments, after the grouping of parcels has been performed by application 46, the grouping may be analyzed to determine whether the groupings should be included in the parcel database 38 or found to be sufficiently accurate for processing. For example, in certain embodiments, the grouped parcels may be analyzed for normalization by confirming that the groupings meet one or more grouping criteria. The grouping criteria may include a threshold for distance between parcels, threshold for number of parcels in a grouping, priorities for attribute matching, addressing sequence characteristics, polygon analysis, etc. The criteria may be checked for each grouping to ensure the group appears to include accurate parcels. For example, a grouping of parcels based on a street name, may be analyzed to check whether the parcels are within a certain threshold distance (e.g., 250 meters) of each other. This kind of analysis can help make sure that the grouped parcels are in close vicinity to each other. If the parcels are in close vicinity and include the same street name, then the confidence in the accuracy of the parcel data may be enhanced and as a result maintained. Similarly, the grouping of parcels may be checked against a threshold number of parcels. The threshold number of parcels can be used to ensure that the groupings are of small size which can enhance their accuracy.

The criteria for priorities of attribute matching may be analyzed in view of the groupings to improve accuracy. For example, the criteria may indicate that the street name and distance attributes take a higher priority over the wilderness area classification. In view of this priority rule, the normalization process may maintain parcels that have the same street name and are in close vicinity even if they are not classified as wilderness areas. A variety of different rules and priorities may be used in embodiments of the present invention. Moreover, in some embodiments, the addressing sequence characteristics of the grouped parcels may be analyzed by the normalization process. For example, for a grouping by street name, the parcel data may be analyzed to check whether the sequence of house numbers is consistent or make sense. If this criterion fails, then the grouping may not be verified and the parcel data may not be maintained. Furthermore, in some embodiments, polygon analysis may be performed on the grouped parcels by the normalization process. A polygon may be drawn connecting or enclosing the grouped parcels. The polygon may then be analyzed to determine whether the polygon is sufficiently small to indicate that the parcels are in close proximity to each other or to determine that the location of the parcels relative to each other make sense. If this criterion fails, then the grouping may not be verified and the parcel data may not be maintained. A variety of different configurations, rules, and criteria are plausible in embodiments of the present invention. An advantage of the embodiments of the present invention is that more parcel data may be included in the parcel database with confidence that the parcel data is likely accurate. More parcel data can enhance analysis based on the parcel data, such as risk assessment, tax assessments, etc. For example, high fire risk for wilderness areas may now be computed for remote areas since the parcel data associated with those areas is stored in the parcel database 38. A variety of other analysis may be enhanced by embodiments of the present invention that relay of accessed parcel data.

Example Property Normalization Process

Figure 2:
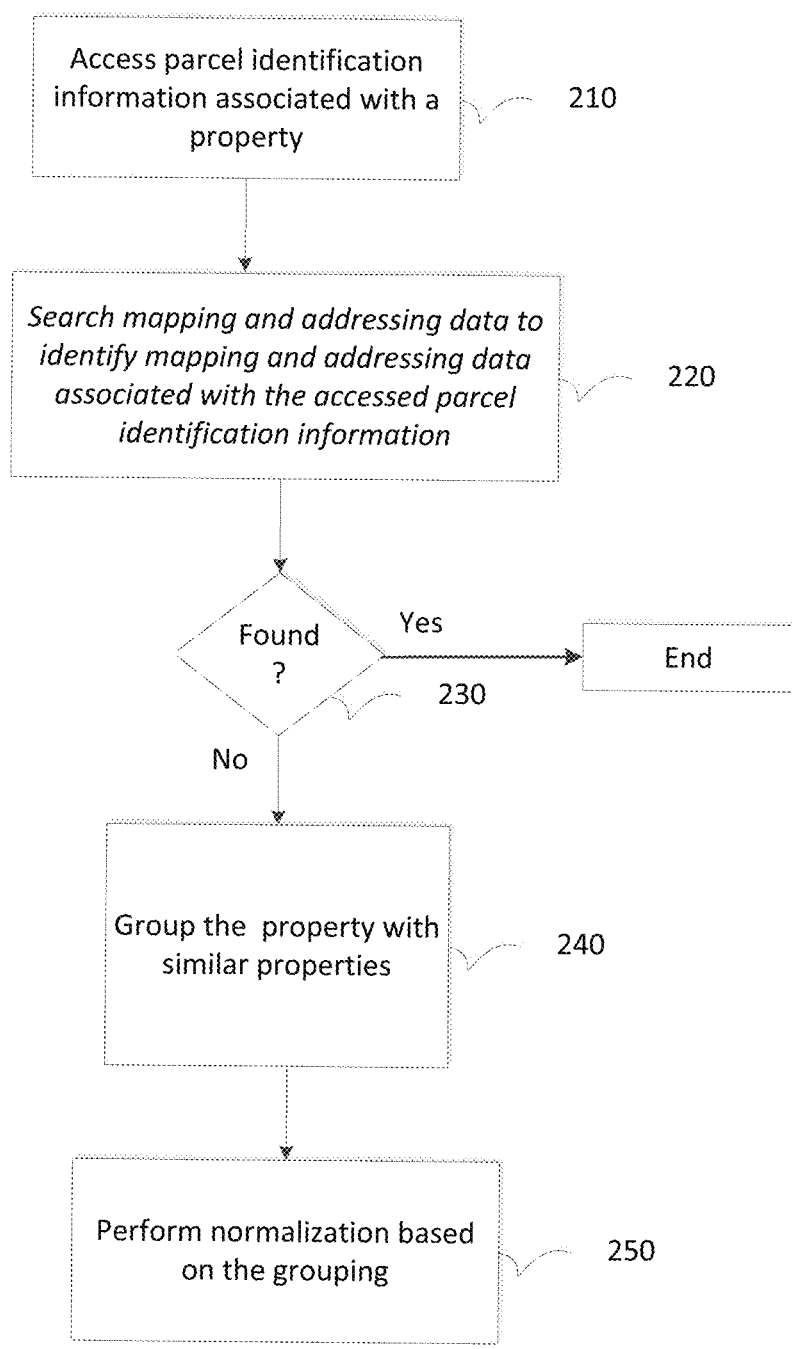
FIG. 2 is a flowchart illustrating a method of performing normalization for parcel data in accordance with an embodiment.

FIG. 2 illustrates one embodiment of an automated process that may be used by the analytics parcels 22 to perform normalization for parcel data associated with a property. As mentioned above, this process may be useful (as one example) for enhancing the accuracy of parcel data that can be used in a variety of applications.

As depicted by block 210 of FIG. 2, the application 46 initially accesses parcel identification information associated with a property. Application 46 may communicate with application 42 to access the parcel identification information associated with the property from the aggregated parcel data.

As shown in block 220 of FIG. 2, the mapping data 32 and addressing data 34 may be searched to identify mapping and addressing data associated with the accessed parcel identification information. As explained above, the application 46 may try to verify the accessed parcel identification information in view of the mapping database 32 and addressing database 34.

Subsequently, as depicted by blocks 230 of FIG. 2, if mapping and/or addressing data associated with the accessed parcel identification information is found, the process ends. As discussed above, if a match is found, then the parcel data may be verified and stored in parcel database 38. As discussed above, adjustment to the parcel information can be made and additional information from the mapping database 32 and/or addressing database 34 may be collected. As also discussed above, even if a match is found, if the match does not meet certain accuracy criteria, then it may be determined that a match was not actually found and the parcel data cannot be verified. If it is determined that the parcel information cannot be verified, then, as illustrated by block 240, application 46 can group the parcel information with similar parcels. As discussed above, the groupings may consider a variety of factors and/or attributes to perform the grouping.

As depicted by block 250 of FIG. 2, application 46 may then perform a normalization process based on the groupings. As discussed above, the normalization process may consider a variety of factors including rules, priorities, grouping criteria, etc. The normalization process determines which of the groupings can be maintained and stored in the parcel database 38. As mentioned above, the enhanced normalization process can result an enhanced parcel data collection in parcel database 38.

Example Wilderness Areas Normalization Process

Figure 3:
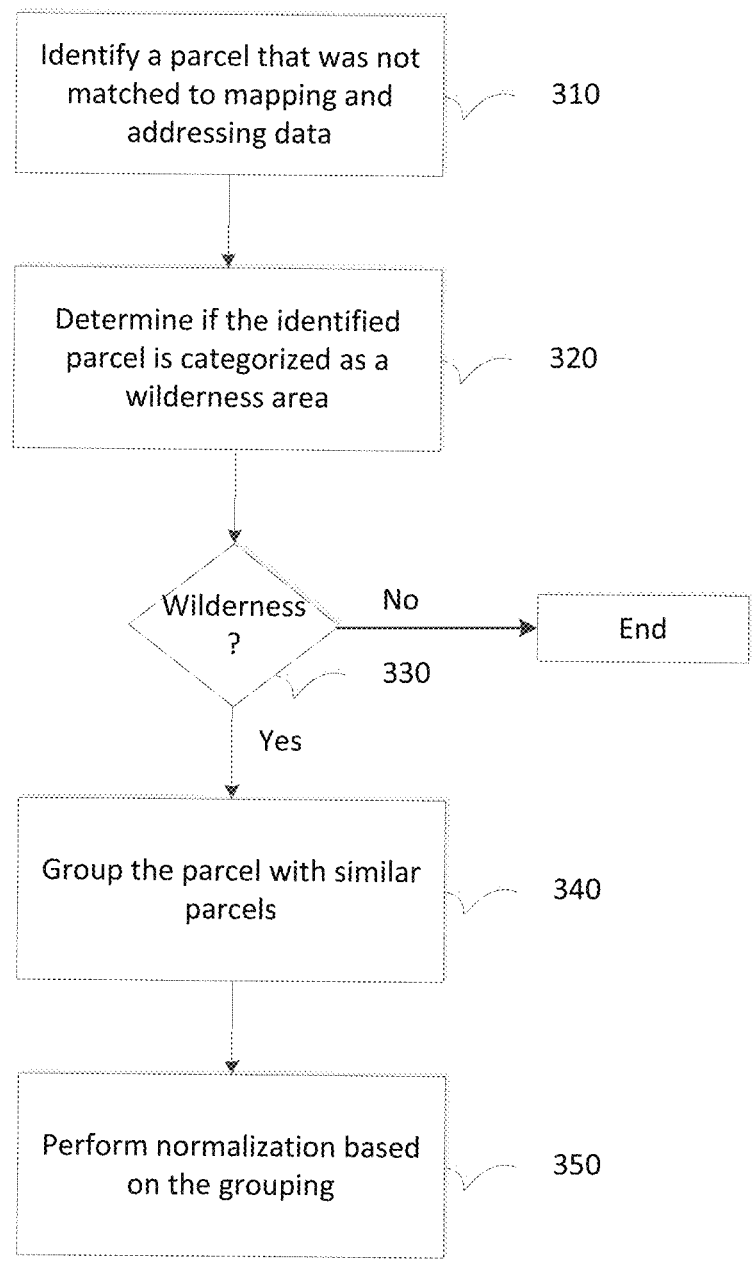
FIG. 3 is a flowchart illustrating a method of performing normalization for parcel data associated with wilderness areas.

FIG. 3 illustrates one embodiment of an automated process that may be used by the analytics parcels 22 to perform normalization for parcel data associated with a property in a wilderness area. As mentioned above, this process may be useful (as one example) for enhancing the accuracy of parcel data that can be used in a variety of applications.

As depicted by block 310 of FIG. 3, the application 46 initially identifies a parcel that was not matched to mapping data 32 and addressing data 34. As discussed above, to enhance the accuracy of the parcel data, data for a parcel that could not be verified by the mapping and/or addressing data, could be analyzed to determine whether the data can be verified by other means.

As shown in block 320 of FIG. 3, land surface data 36 may be searched to determine if the identified parcel is categorized as a wilderness area. As explained above, parcels in wilderness areas that could not be verified, may have a higher likelihood of being accurate. As such, the parcel is checked to see whether it is classified as being in a wilderness area.

Subsequently, as depicted by blocks 330 of FIG. 3, if the parcel is not in a wilderness area, the process ends. As discussed above, in some embodiments for parcels that are not in wilderness areas, it can be determined that the parcel cannot be maintained. If it is determined that the parcel is in a wilderness areas, then, as illustrated by block 340, application 46 can group the parcel with similar parcels. As discussed above, the groupings may consider a variety of factors and/or attributes to perform the grouping.

As depicted by block 350 of FIG. 3, application 46 may then perform a normalization process based on the groupings. As discussed above, the normalization process may consider a variety of factors including rules, priorities, grouping criteria, etc. The normalization process determines which of the groupings can be maintained and stored in the parcel database 38. As mentioned above, the enhanced normalization process can result an enhanced parcel data collection in parcel database 38.

Conclusion

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located, and may be cloud-based devices that are assigned dynamically to particular tasks. The results of the disclosed methods and tasks may be persistently stored by transforming physical storage devices, such as solid state memory chips and/or magnetic disks, into a different state.

The methods and processes for normalization described above may be embodied in, and fully automated via, software code modules executed by one or more general purpose computers. The code modules, such as data aggregation application 42, verification application 44, grouping application 46, and normalization application 48, may be stored in any type of computer-readable medium or other computer storage device. Some or all of the methods may alternatively be embodied in specialized computer hardware. Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed methods may be stored in any type of non-transitory computer data repository, such as data repositories 32-38, relational databases and flat file systems that use magnetic disk storage and/or solid state RAM. Some or all of the components shown in FIG. 1, such as those that are part of the Parcel System, may be implemented in a cloud computing system.

Further, certain implementations of the functionality of the present disclosure are sufficiently mathematically, computationally, or technically complex that application-specific hardware or one or more physical computing devices (utilizing appropriate executable instructions) may be necessary to perform the functionality, for example, due to the volume or complexity of the calculations involved or to provide results substantially in real-time.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network or distributed computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The various elements, features and processes described herein may be used independently of one another, or may be combined in various ways. All possible combinations and subcombinations are intended to fall within the scope of this disclosure. Further, nothing in the foregoing description is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The foregoing disclosure, for purpose of explanation, has been described with reference to specific embodiments, applications, and use cases. However, the illustrative discussions herein are not intended to be exhaustive or to limit the inventions to the precise forms disclosed. Many modifications and variations are possible in view of the above teachings. The embodiments were chosen and described in order to explain the principles of the inventions and their practical applications, to thereby enable others skilled in the art to utilize the inventions and various embodiments with various modifications as are suited to the particular use contemplated.

What is claimed is:

1. A non-transitory computer readable storage medium comprising instructions which, when executed by a computer system that includes a data processor and is connected to at least one data repository, perform a method comprising:
   (a) accessing, by the computer system through a communication channel, identification information associated with a parcel;
   (b) searching, by the computer system from the at least one data repository through a communication channel, mapping data or addressing data associated with the parcel identification information;
   (c) verifying, by the data processor of the computer system, whether the mapping data or addressing data matches the identification information associated with the parcel;
   (d) identifying, by the data processor of the computer system, the parcel as a non-verified parcel in response to a determination that the mapping data or addressing data do not match the identification information associated with the parcel;
   (e) grouping, by the data processor of the computer system, the non-verified parcel with at least one other non-verified parcel to form a non-verified parcel grouping, wherein the non-verified parcel and the at least one other non-verified parcel share at least one parcel characteristic; and
   (f) performing, by the data processor of the computer system, normalization of the non-verified parcel grouping.

2. The non-transitory computer readable storage medium of claim 1, wherein the parcel characteristic is a street name.

3. The non-transitory computer readable storage medium of claim 1, wherein performing normalization comprises checking whether the non-verified parcel grouping satisfies a set of grouping criteria and storing the non-verified parcel and the at least one other non-verified parcel in the at least one data repository only if the non-verified parcel grouping satisfies the set of grouping criteria.

4. The non-transitory computer readable storage medium of claim 3, wherein the set of grouping criteria comprises a distance between the non-verified parcel and the at least one other non-verified parcel.

5. The non-transitory computer readable storage medium of claim 1, wherein the mapping data comprises data from NAVTEQ.

6. The non-transitory computer readable storage medium of claim 1, wherein the addressing data comprises data from a government agency.

7. The non-transitory computer readable storage medium of claim 1, wherein the non-verified parcel is located in a wilderness area.

8. The non-transitory computer readable storage medium of claim 3, wherein the set of grouping criteria comprises an addressing sequence characteristic associated with the non-verified parcel and the at least one other non-verified parcel.

9. The non-transitory computer readable storage medium of claim 8, wherein the addressing sequence characteristic comprises a house number associated with the non-verified parcel and a house number associated with the at least one other non-verified parcel.

10. The non-transitory computer readable storage medium of claim 1, wherein the non-verified parcel is located in a forested area.

11. A system comprising:
   physical data storage configured to store parcel data associated with real estate properties; and
   a computer system in communication with the physical data storage, the computer system comprising computer hardware, the computer system programed to:
      identify a parcel that could not be verified by mapping data and addressing data;
      determine if the identified parcel is categorized as a wilderness area;
      if the parcel is categorized as a wilderness area, group the parcel with at least one other parcel based at least in part on parcel characteristics;
      perform normalization of the parcel based at least in part the grouping; and
      store data associated with the normalized parcel in the physical data storage.

12. The system of claim 11, wherein the parcel characteristics comprise a street name.

13. The system of claim 11, wherein performing normalization comprises checking whether the grouping satisfies a set of grouping criteria.

14. The system of claim 13, wherein the set of grouping criteria comprises a distance between the parcel and the at least one other parcel.

15. A computer-implemented method comprising:
   accessing, by a computer system through a communication channel, identification information associated with a parcel;
   searching, by the computer system from at least one data repository through a communication channel, mapping data or addressing data associated with the parcel identification information;
   verifying whether the mapping data or addressing data matches the identification information associated with the parcel;
   identifying the parcel as a non-verified parcel in response to a determination that the mapping data or addressing data do not match the identification information associated with the parcel;

grouping, by the computer system, the non-verified parcel with at least one other non-verified parcel to form a non-verified parcel grouping, wherein the non-verified parcel and the at least one other non-verified parcel share at least one parcel characteristic; and performing, by the computer system, normalization of the non-verified parcel grouping.

16. The computer-implemented method of claim 15, wherein the parcel characteristic is a street name.

17. The computer-implemented method of claim 15, wherein performing normalization comprises checking whether the non-verified parcel grouping satisfies a set of grouping criteria and storing the non-verified parcel and the at least one other non-verified parcel in the at least one data repository only if the non-verified parcel grouping satisfies the set of grouping criteria.

18. The computer-implemented method of claim 17, wherein the set of grouping criteria comprises an addressing sequence characteristic associated with the non-verified parcel and the at least one other non-verified parcel.

19. The computer-implemented method of claim 18, wherein the addressing sequence characteristic comprises a house number associated with the non-verified parcel and the at least one other non-verified parcel.

* * * * *